United States Patent [19]
Bauer et al.

[11] Patent Number: 5,435,577
[45] Date of Patent: Jul. 25, 1995

[54] HYDRAULIC CLAMPING DEVICE

[75] Inventors: Ulrich Bauer, Steinheim; Monika Schrem, Giengen, both of Germany

[73] Assignee: Albert Schrem Werkzeugfabrik GmbH, Giengen, Germany

[21] Appl. No.: 249,791

[22] Filed: May 25, 1994

[30] Foreign Application Priority Data

May 26, 1993 [DE] Germany .......... 43 17 502.3

[51] Int. Cl.⁶ .......................................... B23F 23/12
[52] U.S. Cl. ...................... 279/4.01; 403/15; 403/31; 409/234
[58] Field of Search .............. 279/4.01; 409/232, 234; 403/15, 31

[56] References Cited

U.S. PATENT DOCUMENTS

| | | | |
|---|---|---|---|
| 3,033,597 | 5/1962 | Miller | 403/15 |
| 3,242,818 | 3/1966 | Kastler | 409/234 |
| 4,137,822 | 2/1979 | Behnke | 409/234 |
| 4,697,966 | 10/1987 | Baur | 279/4.01 |
| 5,125,776 | 6/1992 | Müller et al. | 409/234 |

Primary Examiner—Steven C. Bishop
Attorney, Agent, or Firm—Robert W. Becker & Associates

[57] ABSTRACT

A hydraulic clamping device for axially clamping pieces of radial symmetry has a base body with a longitudinal axis slipped onto a receiving mandrel. An annular piston is floatingly arranged in the base body. A closed circuit hydraulic system for displacing the annular piston relative to the base body toward a piece of radial symmetry to be clamped on the receiving mandrel is provided for securely clamping the piece of radial symmetry on the receiving mandrel. A plurality of compensation wedges arranged at the annular piston have wedge surfaces extending symmetrically to the longitudinal axis of the base body. Adjusting screws that are radially displaceable relative to the longitudinal center axis of the base body are provided for displacing the compensation wedges axially in order to secure the compensation wedges in a clamping position.

21 Claims, 7 Drawing Sheets

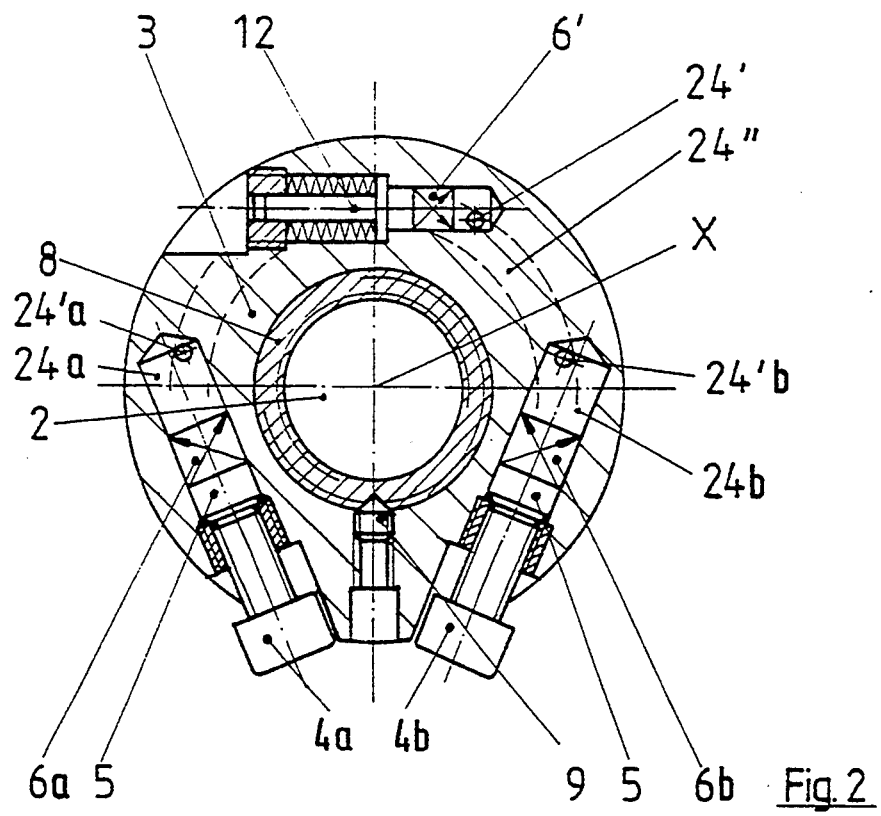
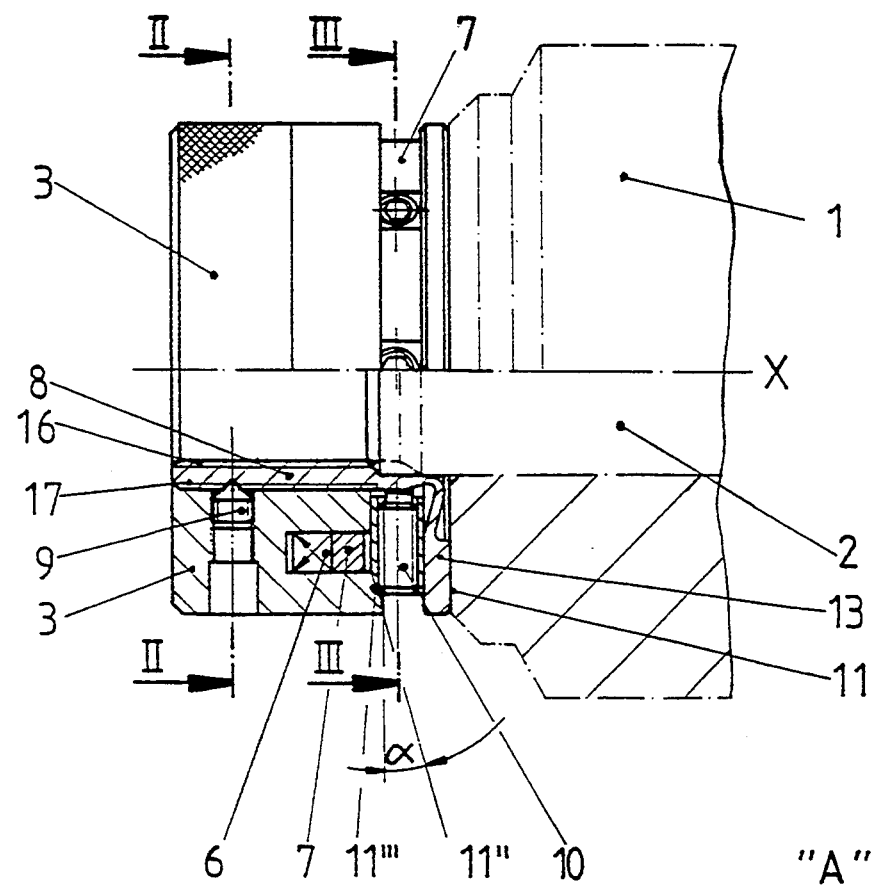
Fig. 2
Fig. 1  "A"

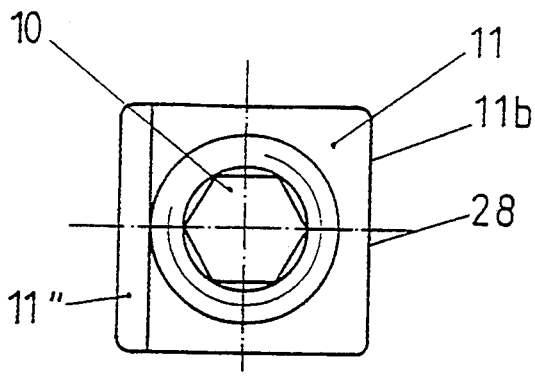
Fig. 5
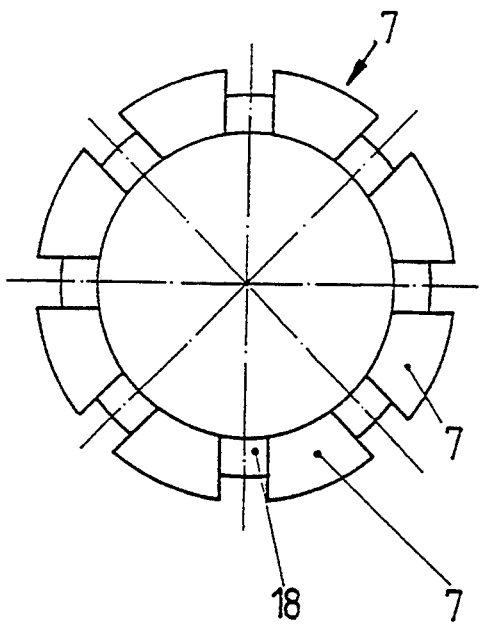
Fig. 6  "A"
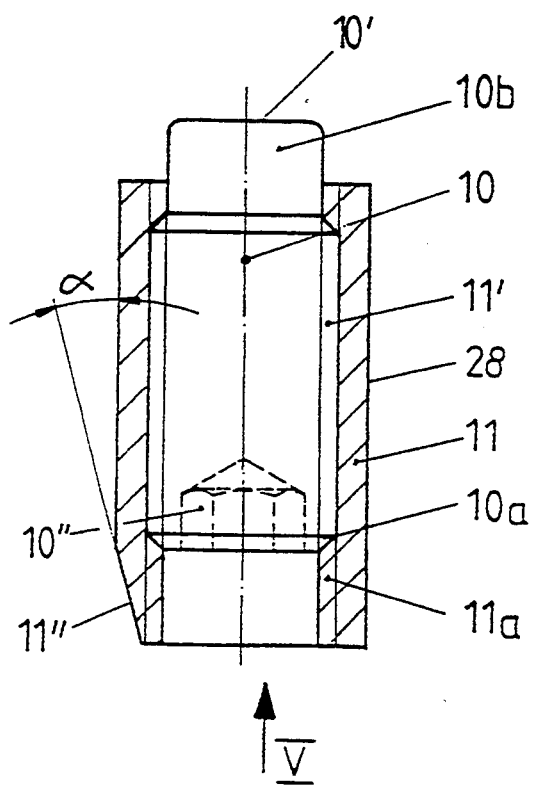
Fig. 4
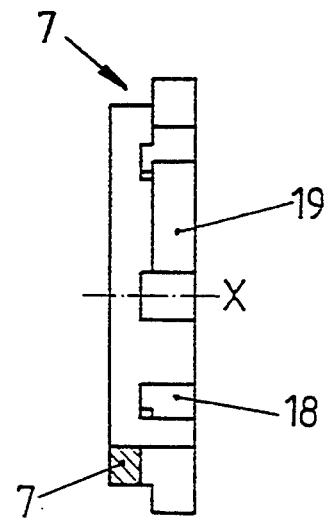
Fig. 7

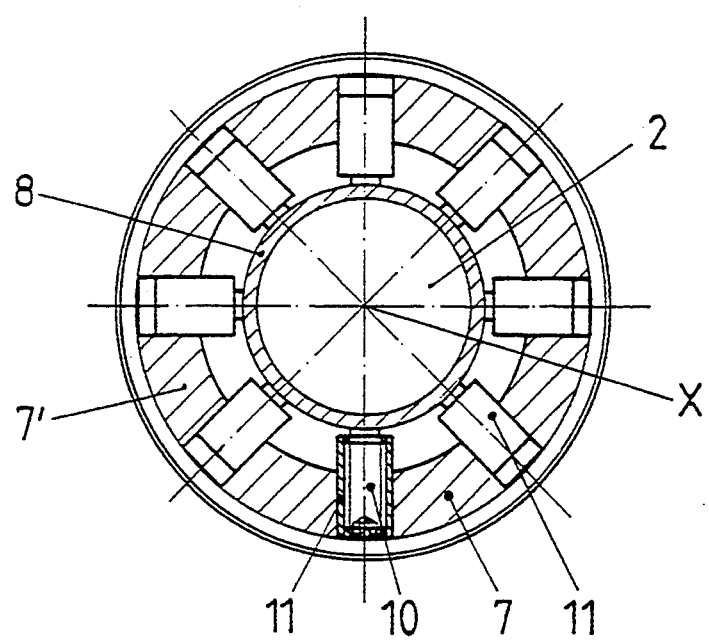
Fig.3
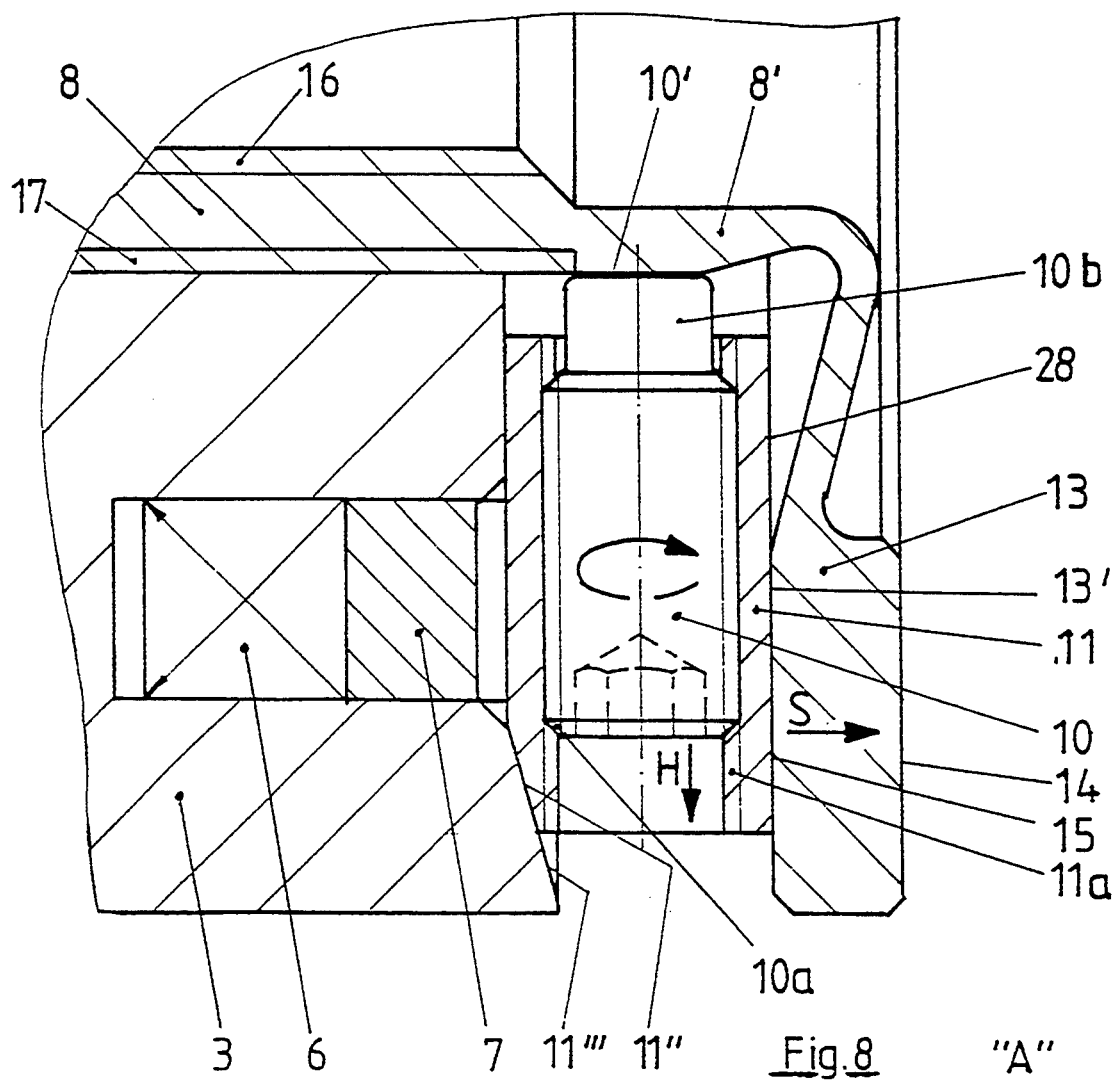
Fig.8  "A"

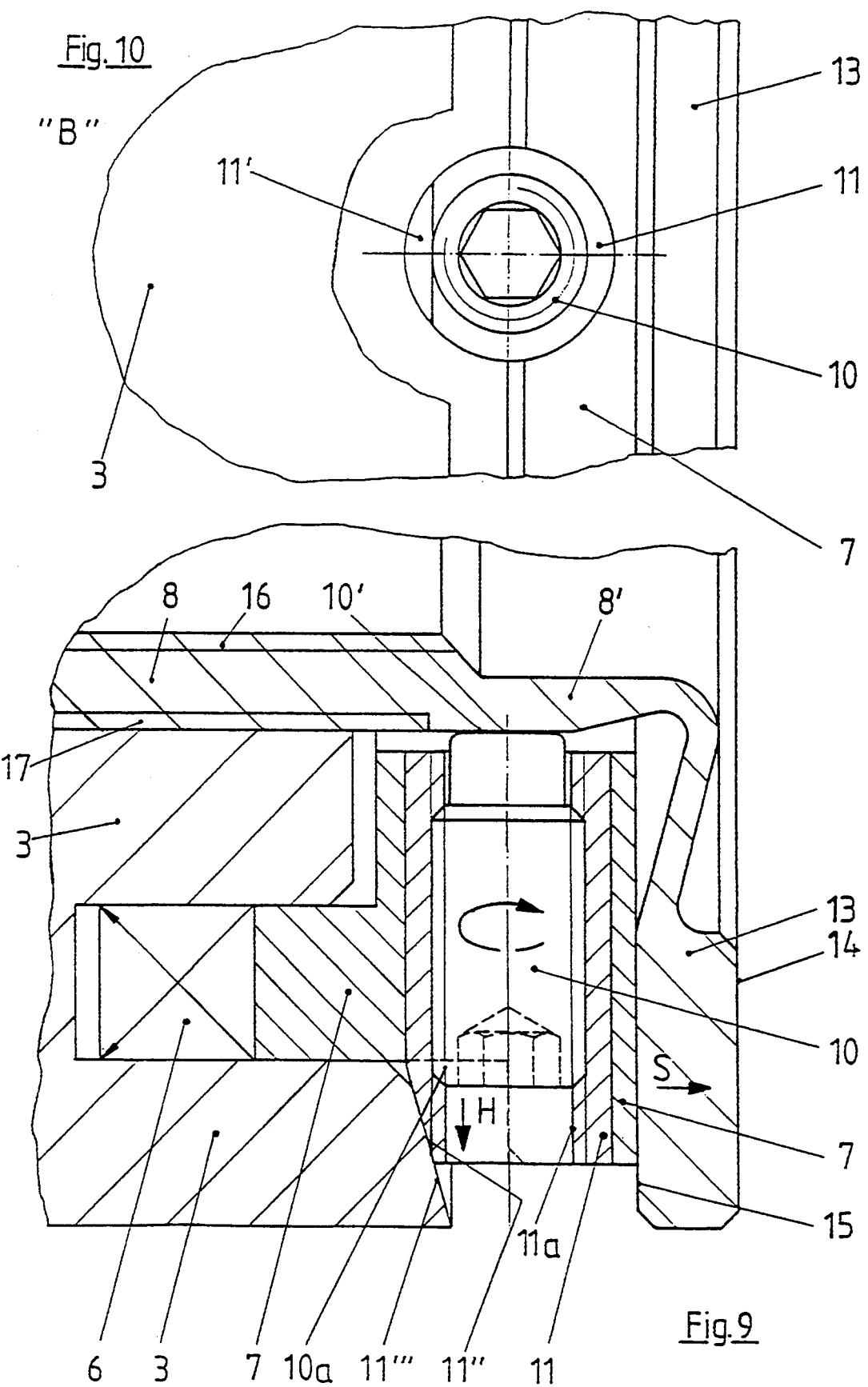

HYDRAULIC CLAMPING DEVICE

BACKGROUND OF THE INVENTION

The present invention relates to a hydraulic clamping device for axially clamping pieces of radial symmetry, such as workplaces, working tools etc., whereby the clamping device has a receiving mandrel and a base body to be slipped onto the mandrel in which base body an annular piston is floatingly arranged. The piston is displaceable by a closed hydraulic system relative to the base body against the piece to be clamped to thereby fixedly clamp that piece with a pressure element. The pressure element is provided with wedge surfaces that are symmetrical to the longitudinal axis of the clamping device which pressure element is axially displaceable with radially movable adjusting screws in order to be moved into the desired clamping position.

A clamping device of this kind is known from German Offenlegungsschrift 39 41 765 and is provided with a pressure element in the form of a conical pressure ring with s wedge-shaped radial cross-section for adjusting a piece to be clamped, for example, a hob, or any other tool of radial symmetry, respectively, a rotating workplace. The pressure element surrounds with relatively great radial play the axial extension of the annular piston and is centered by a rubber ring. In the axial direction the conical pressure ring is arranged between an adjustable threaded ring seated on the base body of the hydraulic clamping device and a spring-elastic radial flange which is threaded with a sleeve onto the mandrel so that the wedge surfaces of the pressure ring rest at corresponding slanted counter surfaces of the spring-elastic flange. Radial pressure screws of the conical pressure ring allow for a desired radial adjustment and thus a desired effect on the axial clamping forces so that the system, comprised of the receiving mandrel, hydraulic clamping device, and the piece to be clamped onto the mandrel, i.e., a tool of radial symmetry, such as a hob, a workpiece, etc. can be aligned in a desired manner, i.e., adjusted such that it is prevented that the workpiece or tool rotates out of true.

The known hydraulic clamping device after adjustment also allows for the relief of the hydraulically loaded annular piston since the plate flange is fixed in its adjusted position by the conical pressure ring and the threaded ring.

However, the known clamping device is disadvantageous because it is technically complicated and requires a relatively great constructive length especially due to the threaded ring and the conical pressure ring together with the centering rubber ring.

It is therefore an object of the present invention to provide a hydraulic clamping device of the aforementioned kind that with a simple construction provides for an optimal short axial constructive length, that is easy to operate, and especially allows for a precise adjustment with respect to trueness of revolution during positioning of the piece to be clamped.

BRIEF DESCRIPTION OF THE DRAWINGS

This object, and other objects and advantages of the present invention, will appear more clearly from the following specification in conjunction with the accompanying drawings, in which:

FIG. 1 shows an embodiment of the inventive clamping device in a partly sectioned side view including the receiving mandrel and the tool seated on the mandrel, which embodiment in the following will be called A;

FIG. 2 shows a section along line II—II of FIG. 1;

FIG. 3 shows a section along line III—III of FIG. 1;

FIGS. 4 and 5 show a compensation wedge according to FIG. 1 in section and in an end view according to arrow V of FIG. 4;

FIGS. 6 and 7 show a top view of an annular piston as well as a radial view of an annular piston, partly in section, of the annular piston according to the embodiment of FIGS. 1 to 5;

FIG. 8 shows in an enlarged representation a detail of FIG. 1;

FIG. 9 shows in partial section a variant B with a cylindrical compensation wedge;

FIG. 10 shows a radial partial section of FIG. 9;

SUMMARY OF THE INVENTION

Figure 12:
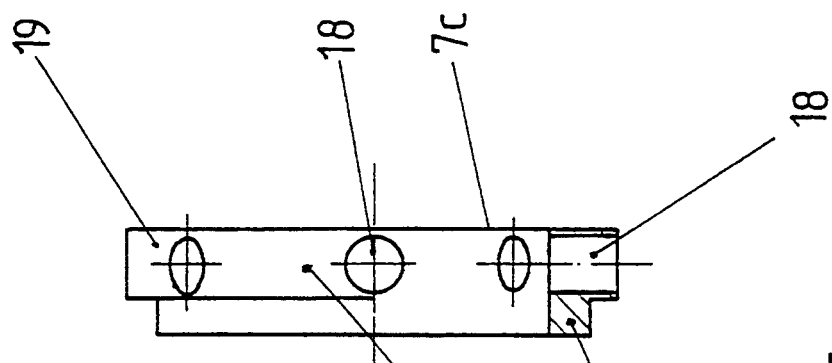
FIGS. 11 and 12 show the annular piston of variant B in a top view, partially in section (FIG. 11) and in a side view partially in section (FIG. 12)
Figure 11:
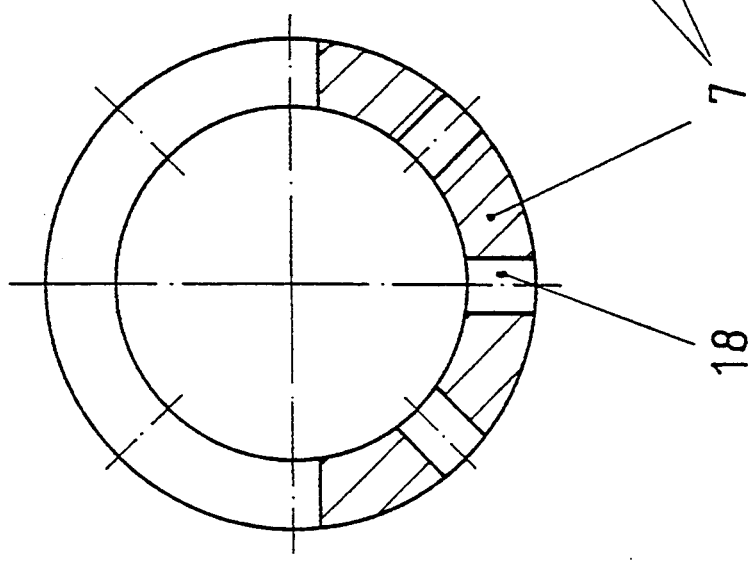

The hydraulic clamping device for axially clamping pieces of radial symmetry on a receiving mandrel according to the present invention is primarily characterized by:

A base body with a longitudinal center axis to be slipped onto a receiving mandrel;

An annular piston floatingly arranged in the base body;

A close circuit hydraulic system for displacing the annular piston relative to the base body toward a piece of radial symmetry to be clamped on the receiving mandrel and securely clamping the piece of radial symmetry on the receiving mandrel;

A plurality of compensation wedges arranged at the annular piston and having wedge surfaces extending symmetrically to the longitudinal center axis of the base body; and Adjusting screws radially displaceable relative to the longitudinal center axis of the base body for displacing the compensation wedges relative to the longitudinal center axis of the base body in order to secure the compensation wedges in a clamping position.

According to the present invention, the pressure element is no longer a closed compensation ring, i.e., the conical pressure ring, but instead is in the form of a plurality of compensation wedges arranged symmetrical to the longitudinal axis of the clamping device (base body) and positioned at the annular piston, and therefore it is possible to dispose of additional support ring. The inventively provided individual compensation wedges can be used for a plurality of clamping device sizes and are easy to produce. The inventive clamping device therefore also has advantages with respect to its manufacture. By uniformly fastening all adjusting screws of the compensation wedges, a uniform axial support relative to the piece of radial symmetry to be clamped is possible even when a spring-elastic radial flange is provided. It is also possible, when needed by a directed activation of individual adjusting screws and thus of certain adjusting compensation wedges, to precisely and easily adjust the trueness of rotation of the workpiece, respectively, working tool.

Preferably, each one of the compensation wedges has one of the adjusting screws connected thereto. The annular piston has a clamping surface facing the piece of radial symmetry to be clamped. The compensation wedges are preferably radially positioned on the clamping surface of the annular piston. Advantageously, the annular piston has receiving elements for receiving the compensation wedges. The compensation wedges are radially displacable within the receiving elements, and the receiving elements are shaped so as to conform to (match) the shape of the compensation wedges. Preferably, the compensation wedges have a rectangular cross-section or a circular cross-section.

In a preferred embodiment of the present invention, each one of the compensation wedges is a sleeve-shaped body with a wedge surface. The base body has counter wedge surfaces for cooperation with the wedged surfaces of the compensation wedges. Upon radial displacement of the adjusting screws, a clamping force is generated acting toward the piece of radial symmetry such that the compensation wedges in a clamping position of the clamping device are supported at the base body. Preferably, the wedge surface is located at one end of the sleeve-shaped body.

For effecting the radial displacement, the adjusting screws are moved radially toward the longitudinal center axis of the base body. Advantageously, an outer sleeve is provided that is screwed onto the mandrel. The compensation wedges have an inner thread for guiding the adjusting screws. The adjusting screws have a radially inner end (bottom), whereby the radially inner end (bottom) rests at a portion of the outer sleeve in its radial inner end position.

Expediently, the wedge surfaces of the compensation wedges and the counter wedge surfaces of the base body are positioned at an angle of 15° to 30°, most preferred at an angle of 20°, relative to the radial direction.

Preferably, the wedge surfaces of the compensation wedges are positioned on a side of the compensation wedges facing the base body.

Advantageously, the clamping device further comprises an outer sleeve with a spring-elastic flange, the outer sleeve to be screwed onto the receiving mandrel. The base body is connected to the outer sleeve and the spring-elastic flange has a first abutment surface for the annular piston and a second abutment surface for the piece of radial symmetry to be clamped. Advantageously, the outer sleeve has an inner thread for threading it onto the receiving mandrel and an outer thread for connecting the base body to the outer sleeve. Preferably, the annular piston has an axial annular projection and the receiving elements are located within the axial annular projection.

In a preferred embodiment of the present invention, the compensation wedges have a rectangular cross-section. An external surface of the compensation wedges serves as a pressure surface abutting at the first abutment surface of the spring elastic flange.

Preferably, the annular piston has an end face facing the piece of radial symmetry to be clamped and, in a clamping position of the piece of radial symmetry, the end face abuts directly at that piece of radial symmetry.

Preferably, the clamping device further comprises a spring member positioned in the axial direction between the compensation wedges and the piece of radial symmetry to be clamped. The spring member is preferably a spring-elastic open ring.

Advantageously, four to ten of the compensation wedges are distributed in a circumferential direction of the annular piston whereby each one of the compensation wedges is in the form of a sleeve shaped body with a wedge surface and has inserted therein one of the adjusting screws. In a most preferred embodiment of the present invention eight such compensation wedges are provided.

A further advantage of the inventive clamping device is that due to the simple construction of the clamping device a faulty operation is practically precluded. The invention ensures also that upon relief of the annular piston, i.e., upon relief of the hydraulic system, the adjusted trueness of revolution is maintained. This is achieved by providing the sleeve-shaped compensation wedges with a slanted surface in the form of a wedge, preferably at its head portion (radially outer portion), which has coordinated therewith a corresponding slanted surface at the base body of the clamping device whereby upon radial adjustment of the adjusting screws, i.e., during adjustment of the clamping device, the compensation wedges are supported in the adjusted position at the base body. This provides for a mechanically rigid support between the piece of radial symmetry to be clamped, i.e., the working tool or workpiece, the compensation wedges, and the base body of the clamping device threaded onto the mandrel, even when, as described infra, in special embodiments a sleeve with a radially spring-elastic flange is provided that receives with its outer thread the base body.

DESCRIPTION OF PREFERRED EMBODIMENTS

The present invention will now be described in detail with the aid of several specific embodiments utilizing FIGS. 1 through 18.

In all embodiments of the invention a piece of radial symmetry in the form of a disk or shaft-type piece 1 to be clamped, for example, a workpiece, a working tool, especially a hob etc., is slipped onto a receiving mandrel 2 whereby this piece of radial symmetry rests at the opposite end of the mandrel (not represented), at a collar or a similar abutment.

Onto the shown free end of the mandrel 2 the clamping device with base body 3 and annular piston 7, floatingly arranged within the base body 3, is threaded. In the embodiments A (FIG. 1 to 8), B (FIG. 9 and 10), and D (FIGS. 15 to 18) the base body 3 of the clamping device is threaded onto the outer thread 17 of an outer sleeve 8 which itself is connected with an inner thread 16 on the mandrel 2. The outer sleeve 8 is provided with a radial flange 13 in the form of a plate spring. The radial flange 13 has an abutment surface 14 (FIG. 8) for abutting at the piece to be clamped (workpiece or working tool) and an abutment surface 15 on the other side which is facing the annular piston 7.

The base body 3 is thus fixedly screwed onto the outer sleeve 8 in the embodiments A, B, and D.

Figure 14:
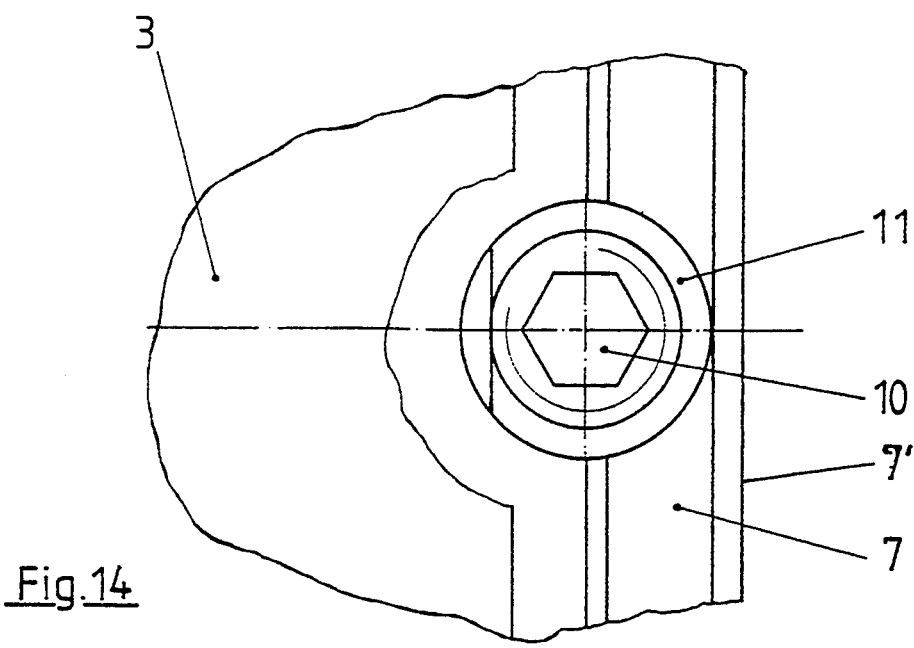
FIGS. 13 and 14 show a further variant C in representations corresponding to FIGS. 9 and 10.
Figure 13:
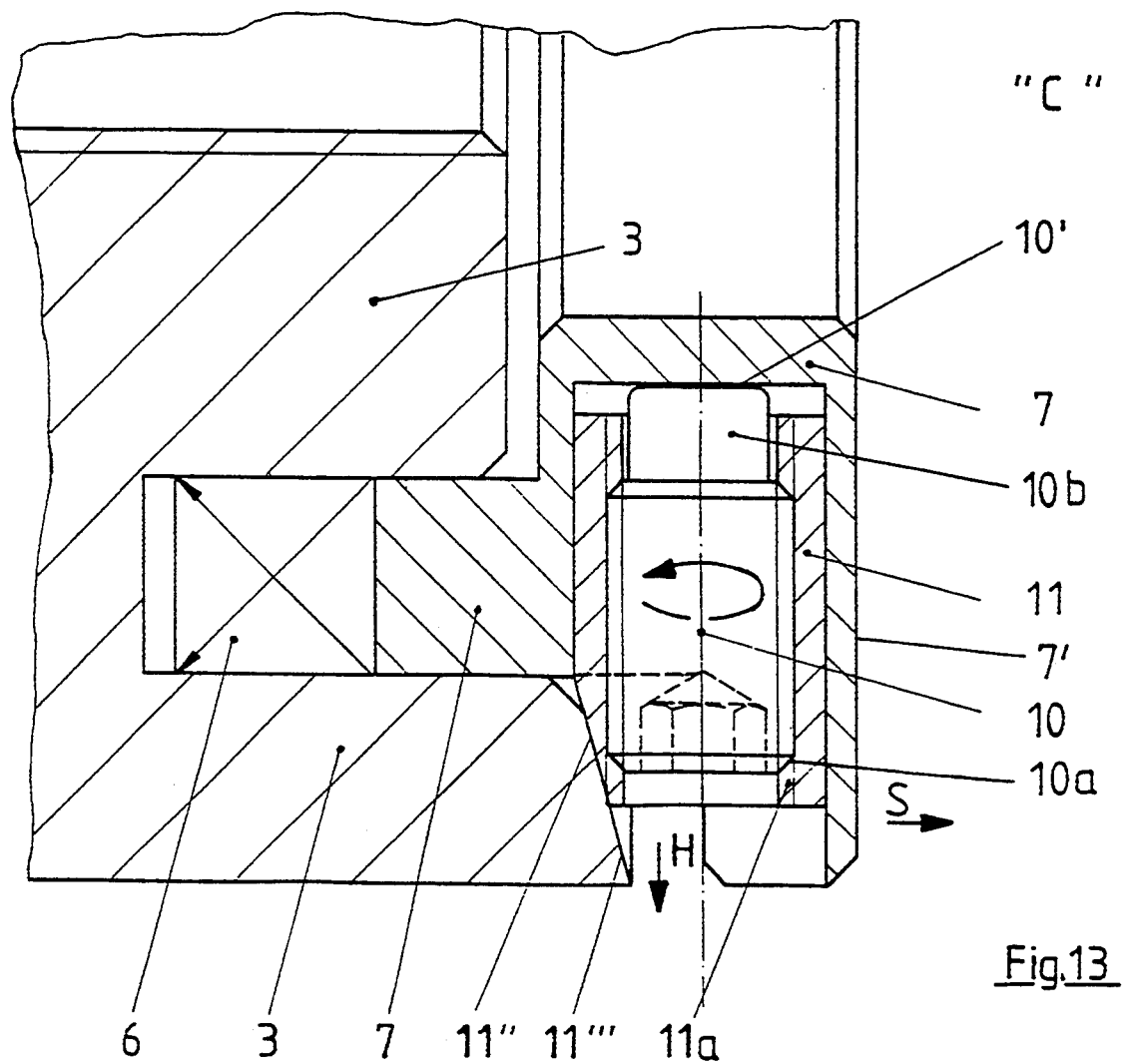

FIGS. 13 and 14 show an embodiment C in which by elimination of the spring-elastic flange 13 the annular piston 7 rests directly at the planar surface of the piece 1 to be clamped.

In all embodiments the base body 3 may be secured with a screw 9 relative to the outer sleeve 8, respectively, the mandrel 2 in its desired position (compare FIG. 1).

Within the base body 3 two cylindrical hydraulic channels 24a, 24b with seals 6a, 6b and pressure screws 4a, 4b are provided. The channels 24a, 24b communicate via bores 24'a, 24'b, 24'c with the axially movable annular piston 7 provided with seal 6 (see for example FIG. 1). In the base body 3 a clamping force indicator 12 with a seal 6' is positioned and is hydraulically connected with the annular channel 24" positioned in front of the annular piston 7. The annular piston 7 is floatingly arranged and is axially displaceable relative to the base body 3 by a closed hydraulic circuit such that upon a corresponding clamping pressure, which is applied with the screws 4, it is moved toward the piece 1 of radial symmetry for clamping the piece at the clamping device.

Between the annular piston 7 and the abutment surface of the working tool or workpiece 1 facing the annular piston 7 a pressurized means is provided that, according to the present invention, is embodied in the form of a plurality of compensation wedges 11 positioned on the annular piston 7 and arranged symmetrically to the longitudinal axis of the hydraulic clamping device (i.e., its base body). As can be seen in FIG. 3, these compensation wedges 11, which can also be called support wedges, are uniformly distributed in the circumferential direction of the annular piston 7 whereby depending on the size of the clamping device more than four, preferably eight compensation wedges are expediently provided. The arrangement is such that the individual compensation wedges are radially arranged at the clamping surface 7' of the annular piston 7 facing the piece 1 to be clamped and each are provided with a radially adjustable adjusting screw 10 which in a simple embodiment is in the form of a threaded pin.

The compensation wedges 11 in the embodiment A according to FIGS. 1 to 8 are represented in greater detail in FIGS. 4 and 5. FIGS. 6 and 7 show the annular piston 7 for receiving the compensation wedges 11 according to the present invention.

According to the embodiment A the compensation wedges 11 are substantially sleeve-shaped bodies of a rectangular, preferably square, cross-section. In the interior pin-shaped adjusting screws 10 are provided which are adjustable in the radial direction due to the inner thread 11'. The core diameter of the inner thread 11' is indicated at 10a. In the embodiments A, B and D the adjusting screws 10 have at their bottom end a lug-shaped projection 10b which with its bottom 10' rests at a circumferential surface of a transition projection 8' of the outer sleeve 8 in the completely inserted position. The oppositely arranged head of the adjusting screw 10 is embodied in the form of a socket head cap.

All compensation wedges 11 of the embodiments A to D are sleeve-shaped bodies and have as the wedge means a slanted surface 11" arranged in the area of the free head which has a corresponding slanted surface 11''' provided at the base body. Upon radial displacement of the adjusting screw 10, as indicated in FIG. 8 with the annular arrow, the screw 10 moves the compensation wedge 11 in the direction of arrow H because the bottom 10' rests at the projection 8' (compare FIG. 8, 9, 13), i.e., adjusts the compensation wedge 11 radially outwardly whereby the slanted wedge surface 11' of the compensation wedge 11 comes into contact with the corresponding wedge surface 11''' of the rigid base body 3 and thus exerts a clamping force on the flange 13 in the direction of arrow S. Thus, the outer surface 11b of the compensation wedge 11 presses against the abutment surface 15 of the flange 13 so that the oppositely arranged abutment surface 14 is forced against the corresponding abutment surface of the piece 1 of radial symmetry to be clamped.

In order to effect this, each compensation wedge 11 is held in a receiving element 18 of the annular piston 7 (see FIGS. 6 and 7). In the embodiment A the receiving element 18 is groove-shaped to correspond to the rectangular or square cross-section of the compensation wedge 11 (FIGS. 4 and 5) such that the compensation wedge 11 can be displaced within the receiving element 18 in the radial direction corresponding to the rotation of the adjusting screw 10.

The slanted surface 11' at the compensation wedge 11 and the slanted surface 11''' at the base body 3 are positioned at an angle $\alpha$ between 10° and 30° relative to the radial direction. Preferably, the angle $\alpha$ is selected such that no automatic locking can result when during disassembly accidentally the hydraulic pressure is released first and the adjusting screws 10 are released afterwards. This is a substantial advantage because in the prior art the support ring must first be removed before the hydraulic pressure can be relieved since otherwise the support ring would jam. The slanted surface 11'' of the compensation wedges 11 in the shown embodiments are provided at the side of the wedges 11 facing the base body 3 so that a direct cooperation with the counter wedge surfaces 11''' at the base body is possible.

The compensation wedges 11, as mentioned before, are arranged in the receiving elements 18 of the annular piston 7. For this purpose, the actual annular piston 7 is provided with an axially extending projection 19 (see FIGS. 7 and 18) in which the receiving elements 18 are provided. In the embodiment A of FIGS. 1 to 8, i.e., in the square embodiment of the compensation wedges, the planar outer surfaces 11b of the compensation wedges 11 provide the pressure surfaces for the clamping force acting in the direction toward the piece 1 of radial symmetry to be clamped. The segments of the clamping surface 7' of the ring piston 7 provided between the receiving elements 18 thus provide also abutment surfaces for the flange 13.

In the embodiments A, B, and D the base body 3 is threaded onto the outer sleeve 8 which is provided with a spring-elastic radial flange 13 (plate flange) that has an abutment surface 15 for the annular piston 7, respectively, for the pressure surfaces 11b of the compensation wedges 11 guided within the annular piston 7 (compare pressure surface 11b in FIG. 5). The opposite parallel side of the radial flange 13 forms the abutment surface 14 for the piece 1 of radial symmetry to be clamped. Due to the arrangement of the plate flange 13 radially oriented adjusting forces, that result in particular due to shearing loads during operation, can no longer act on the annular piston 7, but are transmitted to the spring-elastic plate flange 13. Furthermore, the plate flange 13 compensates especially during movement of the annular piston 7 in the clamping direction possibly occurring non-uniform movements.

The embodiment B corresponding to FIGS. 9 to 12 differs from the embodiment A only in that the cross-section of the compensation wedges is round whereby the function is the same as for the embodiment A. In FIGS. 9 to 12 and in the other Figures same parts are identified with same reference numerals. In the embodiment B the round compensation wedges 11 are seated in the cylindrical receiving elements 18 of the annular piston 7 which are provided with annular, axially extending projections 19 whereby the annular surface 7c, as can be seen in FIGS. 9 and 10, rests directly at the abutment surface 15 of the flange 13. When the adjusting screw 10 that is threaded with its outer thread into the compensation wedge 11 is rotated in the direction of the shown annular arrow (FIG. 9), the compensation wedge 11 is moved radially outwardly in the direction of the shown arrow H since the screw rests with its bottom 10' at the counter surface 8' of the outer sleeve 8, thereby generating the clamping force acting in the direction of arrow S on the flange 13 which flange 13, in turn, is clamped with its abutment surface 14 against the corresponding surface of the piece 1 of radial symmetry to be clamped. The clamping force results because the slanted surface 11' of the compensation wedge 11 is forced radially outwardly and thus abuts at the wedge surface 11''' of the base body 3 thereby supporting the clamping force acting on the piece 1 of radial symmetry.

In the embodiment C of FIGS. 13 and 14, the adjusting screw 10, as shown in the embodiment B, is positioned in a compensation wedge 11 of a circular cross-section which is also radially slidably supported in a receiving element 18, as shown in the embodiment B. The difference to the embodiments A, B, D lies in the fact that the plate-shaped flange 13 for returning the hydraulic system is no longer provided as an intermediate element so that the annular piston 7 with its radial clamping surface 7' (FIG. 12) is clamped directly against the radial planar surface of the piece 1 of radial symmetry to be clamped. In this embodiment the compensation wedge 11 with its slanted surface 11'' supported within the floating annular piston 7 is directly clamped between the base body 3 and the planar clamping surface of the piece 1 of radial symmetry to be clamped. The clamping action results, as in the previous described embodiments, by rotating the adjusting screw 10 in the direction of the annular arrow shown in FIG. 13 so that the compensation wedge 11 abuts in the radial direction (arrow H) with its slanted surface 11'' at the corresponding slanted surface 11''' of the base body 3, thus generating a clamping force in the direction S.

Figures 16, 17, 18:
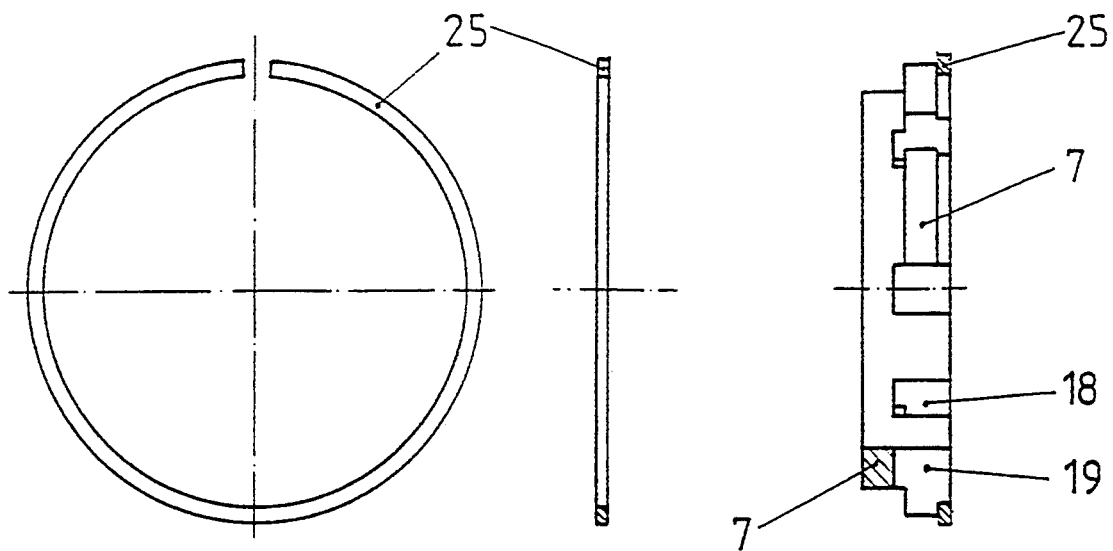
FIGS. 16 and 17 show a detail of the embodiment according to FIG. 15, i.e., an open spring ring in a front view and in a side view.
FIG. 18 shows in an end view and in part section an annular piston according to the embodiment of FIG. 15 with spring ring.
Figure 15:
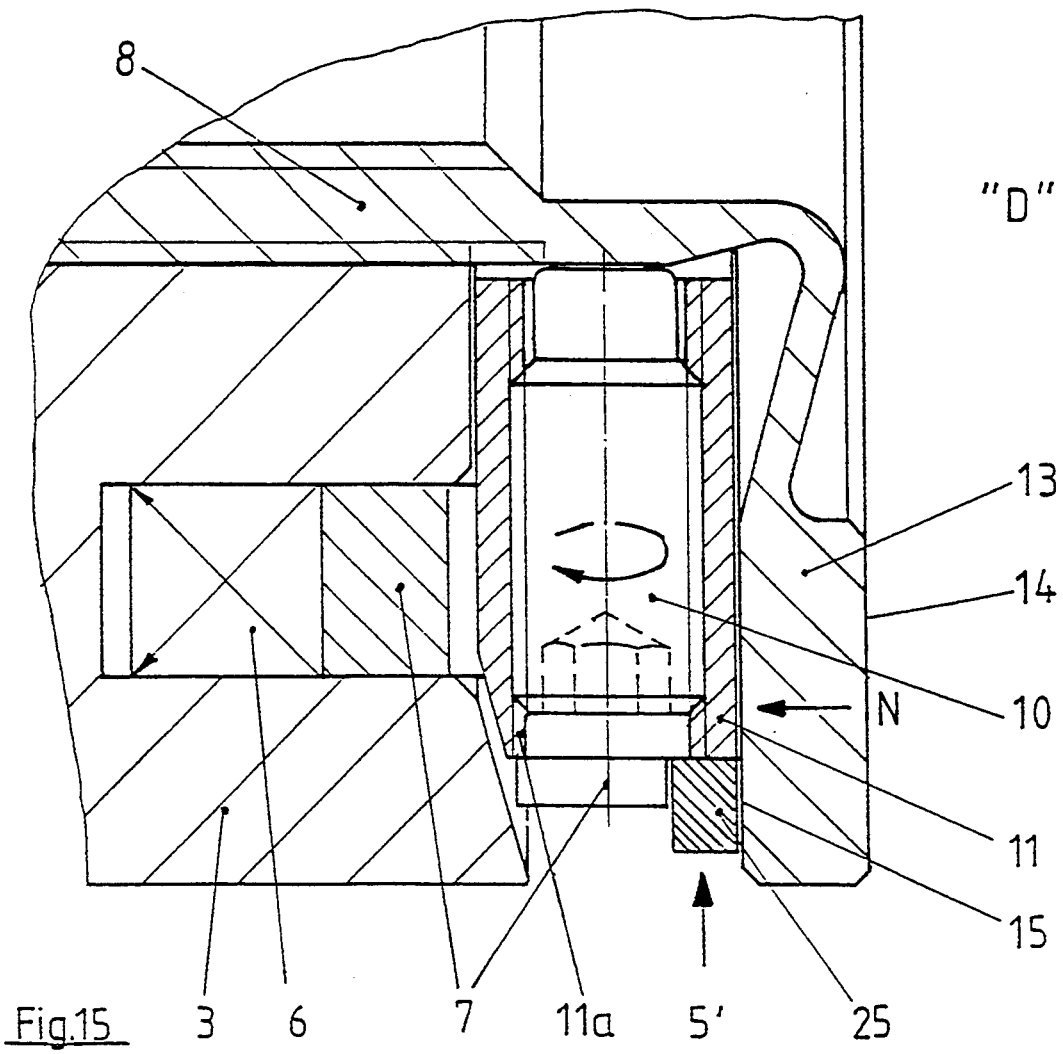
FIG. 15 shows a third variant D in section according to FIG. 13.

The embodiment D corresponding to FIGS. 15 to 18 corresponds in principle to the construction of the embodiments A and B, whereby however the spring-elastic element is in the form of a spring ring 20 which automatically returns the compensation wedges 11 as soon as the adjusting screw 10 is threaded out of the compensation wedge. In the embodiment shown, the spring ring 20 is an open spreadable ring which upon retraction of the adjusting screw 10 (compare arrow S') contracts so that a return force in the direction of arrow N acts on the annular piston 7 and thus on the compensation wedges 11. This spring ring 20 is shown in a particular embodiment in detail in FIG. 16 and 17. FIG. 18 shows the annular piston 7 of the embodiment D in a radial view, partially in section. It is shown that the receiving elements 18 for the compensation wedges 11 are not round, but rectangular, preferably square, in cross-section, so as to match the embodiment of the compensation wedges. FIG. 15 shows the annular piston 7, the compensation wedge 11, and the adjusting screw 10 in a position in which the adjusting screw 10 is retracted, i.e., the hydraulic pressure is relieved and accordingly the compensation wedges 11 are returned automatically by the effect of the spring ring 20.

The operation of the represented embodiments is as follows. In the embodiments A, B, and D, the clamping device in its entirety is threaded in a first step onto the receiving mandrel 2 until it rests flush with the abutment surface 14 of the spring-elastic flange 13 at the counter clamping surface of the piece 1 of radial symmetry. Then the pressure screws 4 are tightened and pressure is generated within the hydraulic system until the desired clamping force is reached which is displayed on the clamping force display 12. Subsequently, all adjusting screws 10 are uniformly tightened so that the spring-elastic flange 13, in the embodiments A, B, D, is supported with the compensation wedges 11 axially at the base body 3. This results in a mechanically functioning, in itself rigid support between the piece 1 of radial symmetry and the base body 3 of the clamping device. By a directed adjustment of individual adjusting screws 10 the trueness of revolution of the piece 1 of radial symmetry can be optimally adjusted. Subsequently, the hydraulic system can be relieved without affecting the rigid support. Furthermore, the angle α of the wedge surfaces 11' at the compensation wedges 11 and the base body 3 can be selected such that no automatic locking results when during disassembly first the hydraulic pressure is accidentally relieved and only thereafter the adjusting screws are relieved so that, as mentioned before, with respect to devices of the prior art it is no longer necessary to remove in a first step the support ring before the hydraulic pressure can be relieved in order to prevent a jamming of the support ring and thus necessitating a reactivation of the hydraulic system for releasing the support ring.

The present invention is, of course, in no way restricted to the specific disclosure of the specification and drawings, but also encompasses any modifications within the scope of the appended claims.

What we claim is:

1. A hydraulic clamping device for axially clamping pieces of radial symmetry onto a receiving mandrel, said device comprising:
   a base body with a longitudinal center axis to be slipped onto a receiving mandrel;
   an annular piston floatingly arranged in said base body;
   a closed circuit hydraulic system for displacing said annular piston relative to said base body toward a piece of radial symmetry to be clamped on the receiving mandrel and securely clamping the piece of radial symmetry on said receiving mandrel;
   a plurality of compensation wedges arranged at said annular piston and having wedge surfaces extending symmetrically to said longitudinal center axis of said base body; and
   adjusting screws radially displaceable relative to said longitudinal center axis of said base body for displacing said compensation wedges relative to said longitudinal center axis of said base body in order to secure said compensation wedges in a clamping position.

2. A clamping device according to claim 1, wherein:
   each one of said compensation wedges has one of said adjusting screws connected thereto;
   said annular piston has a clamping surface facing the piece of radial symmetry to be clamped; and
   said compensation wedges radially positioned on said clamping surface of said annular piston.

3. A clamping device according to claim 2, wherein:
said annular piston has receiving elements for receiving said compensation wedges;
said compensation wedges are radially displaceable within said receiving elements; and
said receiving elements are shaped so as to conform to a shape of said compensation wedges.

4. A clamping device according to claim 3, wherein said compensation wedges have a rectangular cross-section.

5. A clamping device according to claim 3, wherein said compensation wedges have a circular cross-section.

6. A clamping device according to claim 1, wherein:
each one of said compensation wedges is a sleeve-shaped body with a wedge surface;
said base body has counter wedge surfaces for cooperation with said wedge surfaces of said compensation wedges; and
upon a radial displacement of said adjusting screws a clamping force is generated acting toward said piece of radial symmetry such that said compensation wedges in a clamping position of said clamping device are supported at said base body.

7. A clamping device according to claim 6, wherein said wedge surface is located at one end of said sleeve-shaped body.

8. A clamping device according to claim 6, wherein for said radial displacement said adjusting screws are moved radially toward said longitudinal center axis of said base body mandrel.

9. A clamping device according to claim 6, further comprising an outer sleeve to be screwed onto the receiving mandrel, wherein:
said compensation wedges have an inner thread for guiding said adjusting screws; and
said adjusting screws have a radially inner end, said radially inner end resting at a portion of said outer sleeve in a radially inner end position.

10. A clamping device according to claim 6, wherein said wedge surfaces of said compensation wedges and said counter wedge surfaces of said base body are positioned at an angle of 15° to 30° relative to the radial direction.

11. A clamping device according to claim 10, wherein said angle is 20°.

12. A clamping element according to claim 6, wherein said wedge surfaces of said compensation wedges are positioned on a side of said compensation wedges facing said base body.

13. A clamping device according to claim 1, further comprising an outer sleeve with a spring-elastic flange, said outer sleeve to be screwed onto the receiving mandrel, wherein said base body is connected to said outer sleeve and wherein said spring-elastic flange has a first abutment surface for said annular piston and a second abutment surface for said piece of radial symmetry to be clamped.

14. A clamping device according to claim 13, wherein said outer sleeve has an inner thread for threading onto said receiving mandrel and an outer thread for connecting said base body to said outer sleeve.

15. A clamping device according to claim 13, wherein said annular piston has an axial annular projection and wherein said receiving elements are located within said axial annular projection.

16. A clamping device according to claim 13, wherein said compensation wedges have a rectangular cross-section and wherein an external surface of said compensation wedges serves as a pressure surface abutting at said first abutment surface of said spring-elastic flange.

17. A clamping device according to claim 1, wherein said annular piston has an end face facing said piece of radial symmetry to be clamped and wherein in a clamping position of said piece of radial symmetry said end face abuts directly at said piece of radial symmetry.

18. A clamping device according to claim 1, further comprising a spring member positioned in the axial direction between said compensation wedges and said piece of radial symmetry to be clamped.

19. A clamping device according to claim 18, wherein said spring member is a spring-elastic open ring.

20. A clamping device according to claim 2, wherein four to ten of said compensation wedges are distributed in a circumferential direction of said annular piston, each one of said compensation wedges being a sleeve-shaped body with a wedge surface and having inserted therein one of said adjusting screws.

21. A clamping device according to claim 20, wherein eight of said compensation wedges are provided.

* * * * *